Patented June 13, 1933

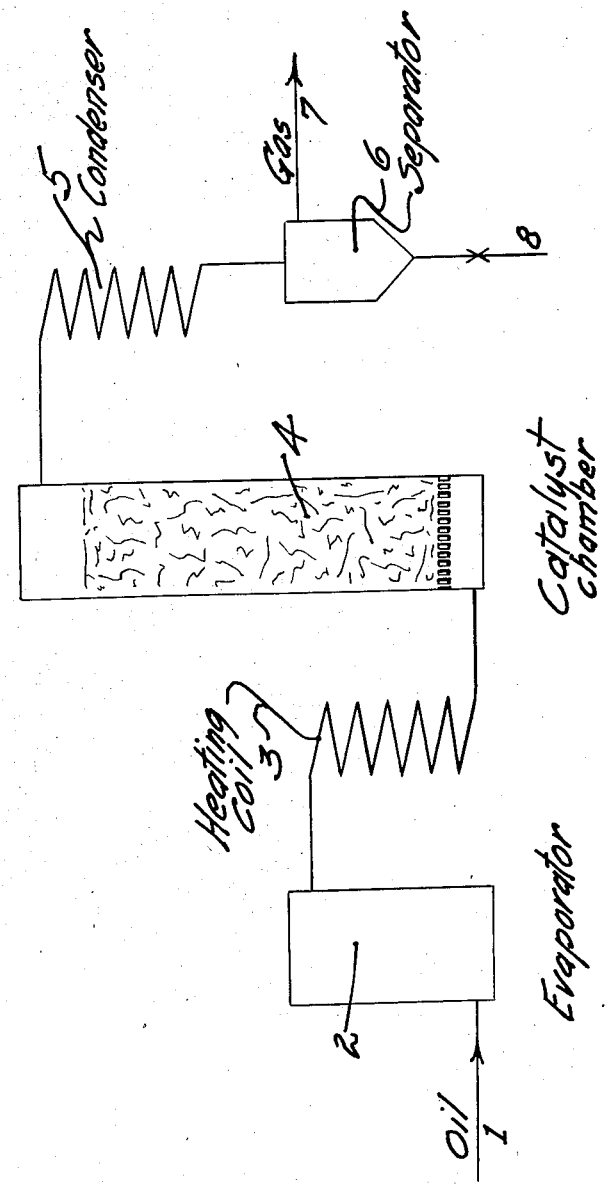

1,913,941

UNITED STATES PATENT OFFICE

ALWIN MITTASCH, OF MANNHEIM, MATHIAS PIER, OF HEIDELBERG, RUDOLF WIETZEL, OF LUDWIGSHAFEN-ON-THE-RHINE, AND HELLMUTH LANGHEINRICH, OF MERSEBURG, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF HYDROCARBONS

Original application filed February 24, 1927, Serial No. 170,737, and in Germany February 26, 1926. Divided and this application filed May 7, 1928. Serial No. 275,962.

The present application is a divisional application relating to subject-matter, which has been divided out from application for Letters Patent Ser. No. 170,737, filed Feb. 24, 1927, and relates to the production of valuable, chiefly aromatic hydrocarbons from low boiling aliphatic and hydroaromatic hydrocarbons of any origin, in particular those liquid products obtainable by the destructive hydrogenation of coals, tars, mineral oils, distillation products, extraction products and other conversion products or residues thereof and the like, and those resulting from some cracking processes. For the sake of brevity, all such hydrocarbons boiling substantially within the gasoline range are referred to as "low boiling naphthas of the nature of gasoline."

We have found that the said hydrocarbons resulting from decomposition of carbonaceous materials can be converted with good yields into aromatic and other more valuable hydrocarbons by treating them at elevated temperatures with active carbon. The active carbon may be employed alone or together with metals such as alloys of chromium and nickel, and aluminium, zinc sulfid, alumina, pumice stone or the like. The oxids of the metals belonging to the sixth group of the periodic system have been found to be of special efficiency as additions. These oxids may be employed either alone or in mixture with each other or with other efficient materials, in particular with oxids of elements of the third and fourth group of the periodic system. The catalyst may be employed with or without supports. The oxids are preferably subjected to a preliminary treatment with hydrogen or gas mixtures containing hydrogen at an elevated temperature. It has been found that the said catalysts of high efficiency possess the great advantage of being little sensible to catalyst poisons. Therefore a troublesome purification of the products to be treated can be dispensed with. Further, the said catalysts do not or only to a very small extent give rise to undesirable by reactions.

The subject matter of the present application therefore differs from that of application Serial No. 170,737, its parent case, in the catalyst employed for the conversion. In the prior case the catalyst comprises essentially an oxide of a metal from the sixth group of the periodic system, while in the present case the catalyst comprises essentially active carbon and a compound of a metal from the sixth group of the periodic system.

From the resulting reaction products for example considerable amounts of hydrocarbons of the benzene series may be recovered in a more or less pure state by fractional distillation. Or the products may be directly employed for example as fuel for internal combustion engines. When employed for this purpose, the products exhibit the great advantage in comparison with the initial products which often require an addition of so-called "anti-knock agents" that owing to their content in aromatic hydrocarbons such additions can be dispensed with without any undesirable knocks occurring in use even when employed for motors with a high compression rate. Products resulting from some cracking processes are very much inclined to knocking in internal combustion engines and can therefore be employed in engines with a high compression rate only with an addition of an anti-knock agent or in mixture with fuels which are not inclined to knocking which are in most cases high in price. However, by passing such products over dehydrogenating catalysts, for example at temperatures between 400° and 800° C., motor fuels not inclined to knocking and containing more than 15 per cent of aromatic hydrocarbons are directly obtained.

In contradistinction to the oxids of zinc, aluminium, titanium, thorium and to wood charcoal, which have already been suggested for use as dehydrogenating catalysts, the aforementioned specially efficient catalysts are effective already at temperatures of about 200° to 300° C. below those required in the case of the former group of catalysts. Moreover they give an average yield which amounts to several times that obtained with the former group, without any losses occurring by decomposition of the materials to be treated to gaseous products or by polymerization to higher molecular compounds. The said highly efficient catalysts are also very suitable for the production of aromatic hydrocarbons from other products than those mentioned above, i. e. from products of any origin consisting of or containing cycloparaffins or naphthenes hereinafter referred to as cyclic non-aromatic hydrocarbons.

The compounds to be dehydrogenated may be passed over the catalyst in the vapor phase either alone or in mixture with aromatic or saturated hydrocarbons of another kind. Simultaneously with a disengagement of hydrogen a more or less far-going conversion into hydrocarbons chiefly of an aromatic nature takes place. If desired, the materials to be dehydrogenated may be passed over the catalyst while diluted with hydrogen or gas mixtures containing hydrogen, water vapor or inert gases. It has been found that the presence of hydrogen in amounts less than employed in destructive hydrogenation, that is an amount substantially less than 600 liters per kilogram of carbonaceous material does not unfavorably influence the dehydrogenation, but quite on the contrary prevents the formation of high molecular compounds which would gradually diminish the efficiency of the catalyst, the yield and the quantity of material to be treated per unit of time. The process is advantageously carried out at temperatures above 300° C. for example at between 450° and 600° C. and the treatment may take place under ordinary or elevated or reduced pressure.

The present invention will be further explained with reference to the accompanying drawing diagrammatically showing an elevation, partly in section, of a plant in which the process according to the present invention may be carried out with advantage. The invention is, however, not restricted to the particular arrangement shown in this drawing.

Referring to the drawing in detail, the hydrocarbon material to be treated, for example brown coal tar-oil, is supplied at 1 and passed into the evaporator 2 in which it is brought into the vapor state. The resulting vapors are then led into the heating coil 3 in which they are heated to the reaction temperature. Thereupon the vapors pass into the reaction chamber 4 filled with a suitable catalyst, in which the desired conversion occurs. The reaction mixture is then cooled in condenser 5, whereby the condensable constituents are liquefied. In the separator 6 the liquids are separated from the uncondensed gas which escapes at 7. The liquid may be withdrawn through pipe 8.

The following examples will further illustrate how our invention may be carried out in practice, but the invention is not limited to these examples.

*Example 1*

A brown coal (lignite) tar-oil is subjected to destructive hydrogenation under pressure by a known method. The portion of the hydrogenated oil which boils at temperatures below 250° C. and is low in benzene homologues is passed at 550 to 600° C. over porous carbon mixed with zinc oxid. A product containing about 30 per cent or even more of benzene hydrocarbons is obtained. The hydrogen disengaged may be utilized for the destructive hydrogenation of fresh quantities of the tar oil.

*Example 2*

Cyclohexane vapors are mixed with hydrogen and passed at 600° C. over active carbon which was impregnated with a solution of potassium bichromate, dried and reduced at 550° C. with hydrogen. The product obtained by condensing the vapors consists of benzene besides small quantities of unsaturated compounds.

What we claim is:—

1. The process of eliminating the tendency to knock from low boiling naphthas of the nature of gasoline having a tendency to knock which comprises dehydrogenating said naphthas by subjecting them in the absence of heavier hydrocarbons to the action of a catalyst comprising active carbon and a compound of a metal of the sixth group of the periodic system at a temperature between about 300 and 600° C., but in the absence of substantial amounts of gases comprising free oxygen and under such conditions that insufficient hydrogen is present to effect destructive hydrogenation.

2. The process as defined in claim 1 wherein the catalyst comprises active carbon and an oxide of a metal of the sixth group of the periodic system.

3. The process of producing valuable, chiefly aromatic hydrocarbons, which comprises dehydrogenating low boiling naphthas of the nature of gasoline containing cyclic non-aromatic hydrocarbons by heating them in the absence of heavier hydrocarbons at a temperature between about 300 and 600° C. in the presence of a catalyst comprising active carbon and a compound of a metal of the sixth group of the periodic system, but in the absence of substantial amounts of gases comprising free oxygen.

4. The process of eliminating the tendency to knock from low boiling naphthas of the nature of gasoline resulting from the decomposition of carbonaceous materials and having a tendency to knock which comprises dehydrogenating said naphthas by subjecting them in the absence of heavier hydrocarbons to the action of a catalyst comprising active carbon and a compound of a metal of the sixth group of the periodic system at a temperature between about 300 and 600° C., but in the absence of substantial amounts of gases comprising free oxygen.

5. The process of eliminating the tendency to knock from low boiling naphthas of the nature of gasoline obtained by the decomposition of carbonaceous materials and having a tendency to knock which comprises dehydrogenating said naphthas by subjecting them in the absence of heavier hydrocarbons to the action of a catalyst comprising active carbon and an oxide of a metal of the sixth group at a temperature between about 300 and 600° C., but in the absence of substantial amounts of gases comprising free oxygen, said catalyst having been subjected to a preliminary heat treatment with hydrogen.

6. The process of producing valuable hydrocarbons not inclined to knocking which comprises dehydrogenating low boiling naphthas of the nature of gasoline containing cyclic non-aromatic hydrocarbons by heating them to a temperature of between 300 and 600° C. in the absence of heavier hydrocarbons with a catalyst comprising active carbon and a compound of a metal of the sixth group of the periodic system together with an oxide of the third and fourth groups of the periodic system, but in the absence of substantial amounts of gases comprising free oxygen.

7. The process of producing valuable hydrocarbons not inclined to knocking which comprises subjecting in the vapor state low boiling naphthas of the nature of gasoline containing cyclic non-aromatic hydrocarbons to dehydrogenation by heating said naphthas to a temperature of between 300 and 600° C. in the absence of heavier hydrocarbons in the presence of a catalyst comprising active carbon and an oxide of a metal of the sixth group of the periodic system, but in the absence of substantial amounts of gases comprising free oxygen.

8. The process of producing valuable hydrocarbons not inclined to knocking which comprises subjecting in the vapor state low boiling naphthas of the nature of gasoline containing cyclic non-aromatic hydrocarbons to dehydrogenation by heating said naphthas to a temperature of between 300 and 600° C. in the absence of heavier hydrocarbons in the presence of a catalyst comprising active carbon and an oxide of a metal of the sixth group of the periodic system, together with an oxide of the third and fourth groups of the periodic system, but in the absence of substantial amounts of gases comprising free oxygen.

9. The process of eliminating the tendency to knock from low boiling naphthas of the nature of gasoline having a tendency to knock which comprises dehydrogenating said naphthas by subjecting them in the absence of heavier hydrocarbons and in admixture with hydrogen in insufficient amounts to effect destructive hydrogenation to a temperature of between 300 and 600° C. at substantially atmospheric pressure in the presence of a catalyst comprising active carbon and a compound of a metal of the sixth group of the periodic system, but in the absence of substantial amounts of gases comprising free oxygen.

10. The process of eliminating the tendency to knock from low boiling naphthas of the nature of gasoline having a tendency to knock which consists of dehydrogenating said naphthas by heating them at a temperature between about 300 and 600° C. under superatmospheric pressure and in the presence of a catalyst comprising active carbon and a compound of a metal of the sixth group of the periodic system.

11. The process of eliminating the tendency to knock from low boiling naphthas of the nature of gasoline having a tendency to knock which comprises dehydrogenating with naphthas by subjecting them in the absence of heavier hydrocarbons and in admixture with hydrogen in amounts insufficient to produce destructive hydrogenation to a temperature between about 300 and 600° C. at substantially atmospheric pressure in the presence of a catalyst comprising active carbon and a compound of a metal of the sixth group of the periodic system together with an oxide of one of the metals of groups three and four of the periodic system, but in the absence of substantial amounts of gases comprising free oxygen.

12. The process of eliminating the tendency to knock from low boiling naphthas of the nature of gasoline having a tendency to knock which consists of dehydrogenating said naphthas at a temperature between about 300 and 600° C. under superatmospheric pressure and in the presence of a catalyst comprising active carbon and a compound of a metal of the sixth group of the periodic system together with an oxide of one of the metals of groups 3 and 4 of the periodic system.

In testimony whereof we have hereunto set our hands.

ALWIN MITTASCH.
MATHIAS PIER.
RUDOLF WIETZEL.
HELLMUTH LANGHEINRICH.